(12) United States Patent
Kiyooka et al.

(10) Patent No.: US 12,005,787 B2
(45) Date of Patent: Jun. 11, 2024

(54) LAWN MOWER WITH AUTONOMOUS TRAVELING FUNCTION

(71) Applicant: Kanzaki Kokyukoki Mfg. Co., Ltd., Hyogo (JP)

(72) Inventors: Koji Kiyooka, Hyogo (JP); Takashi Nishizawa, Hyogo (JP); Hidetaka Yamanami, Hyogo (JP); Shigeaki Nakagawa, Hyogo (JP); Kengo Sasahara, Hyogo (JP); Hikari Morita, Hyogo (JP); Kohei Ogura, Hyogo (JP)

(73) Assignee: KANZAKI KOKYUKOKI MFG. CO., LTD., Hyogo (JP)

( * ) Notice: Subject to any disclaimer, the term of this patent is extended or adjusted under 35 U.S.C. 154(b) by 912 days.

(21) Appl. No.: 17/017,951

(22) Filed: Sep. 11, 2020

(65) Prior Publication Data
US 2021/0076561 A1    Mar. 18, 2021

(30) Foreign Application Priority Data
Sep. 13, 2019   (JP) .................................. 2019-167771

(51) Int. Cl.
*B60L 50/50*    (2019.01)
*A01D 34/00*    (2006.01)
(Continued)

(52) U.S. Cl.
CPC ............ *B60L 50/50* (2019.02); *A01D 34/008* (2013.01); *A01D 34/64* (2013.01); *B60L 53/20* (2019.02);
(Continued)

(58) Field of Classification Search
CPC .......... B60L 50/50; B60L 53/20; B60L 58/10; B60L 2200/40; B60L 2260/32;
(Continued)

(56) References Cited

U.S. PATENT DOCUMENTS

| 8,668,036 B2 | 3/2014 | Wyatt et al. |
| 10,562,567 B2 * | 2/2020 | Koike .................... B60L 50/16 |

(Continued)

FOREIGN PATENT DOCUMENTS

| EP | 3705341 A1 * | 9/2020 | ............ B60K 15/03 |
| JP | 2013122675 A * | 6/2013 | |

(Continued)

*Primary Examiner* — Arpad Fabian-Kovacs
(74) *Attorney, Agent, or Firm* — CANTOR COLBURN LLP

(57) ABSTRACT

A lawn mower includes a traveling driver, a mower motor, and at least one controller. At least one controller is configured to control the traveling driver in accordance with an operation of a user getting on the lawn mower, control the traveling driver to cause the lawn mower to travel autonomously, on a basis of information detected on the lawn mower, and control the mower motor. The lawn mower includes a lawn detection device configured to detect a condition of a portion of lawn on a front side in a traveling direction, and a position acquisition device configured to acquire self-position information. The at least one controller controls the traveling driver in such a manner that the lawn mower preferentially travels on a portion of lawn that needs to be mowed.

4 Claims, 11 Drawing Sheets

(51) Int. Cl.
*A01D 34/64* (2006.01)
*B60L 53/20* (2019.01)
*B60L 58/10* (2019.01)
*G05D 1/00* (2006.01)
*G06T 7/00* (2017.01)
*A01D 101/00* (2006.01)
*H01M 50/247* (2021.01)
*H01M 50/249* (2021.01)
*H02J 7/00* (2006.01)
*H02J 7/02* (2016.01)
*H02J 50/80* (2016.01)

(52) U.S. Cl.
CPC ............ B60L 58/10 (2019.02); G05D 1/0212 (2013.01); G06T 7/0002 (2013.01); *A01D 2101/00* (2013.01); *B60L 2200/40* (2013.01); *H01M 50/247* (2021.01); *H01M 50/249* (2021.01); *H02J 7/0045* (2013.01); *H02J 7/0048* (2020.01); *H02J 7/02* (2013.01); *H02J 50/80* (2016.02); *Y02E 60/10* (2013.01)

(58) Field of Classification Search
CPC ............... G05D 1/0212; G05D 1/0246; G05D 2201/0201; G05D 2201/0208; G06T 7/0002; A01D 34/008; A01D 34/64; A01D 2101/00; H01M 50/247; H01M 50/249; H02J 7/0045; H02J 7/0048; H02J 7/02; H02J 50/80; Y02E 60/10; Y02T 10/70; Y02T 10/7072; Y02T 90/14
See application file for complete search history.

(56) References Cited

U.S. PATENT DOCUMENTS

| | | | | |
|---|---|---|---|---|
| 2009/0000839 | A1* | 1/2009 | Ishii | B62D 11/04 |
| | | | | 701/41 |
| 2017/0156261 | A1* | 6/2017 | Ito | A01D 34/58 |
| 2017/0280623 | A1* | 10/2017 | Yamamura | G05D 1/0265 |
| 2018/0303027 | A1* | 10/2018 | Koike | B60L 50/51 |
| 2018/0326860 | A1 | 11/2018 | Ito et al. | |
| 2019/0075724 | A1* | 3/2019 | Becke | A01D 69/02 |
| 2019/0141887 | A1* | 5/2019 | Matsuda | G06T 7/0012 |
| | | | | 56/255 |
| 2019/0381988 | A1* | 12/2019 | Matsuda | B60L 58/12 |
| 2019/0387671 | A1* | 12/2019 | Umemoto | A01D 34/74 |
| 2022/0212602 | A1* | 7/2022 | Watanabe | A01D 41/127 |
| 2022/0382278 | A1* | 12/2022 | Nishii | A01B 69/008 |
| 2023/0085285 | A1* | 3/2023 | Lee | A01D 41/1278 |
| | | | | 701/23 |

FOREIGN PATENT DOCUMENTS

| | | | | | |
|---|---|---|---|---|---|
| JP | 2015002687 | A | * | 1/2015 | ........... A01D 34/008 |
| JP | 2015026247 | A | * | 2/2015 | |
| JP | 2019088252 | A | | 6/2019 | |
| JP | 2019165665 | A | * | 10/2019 | |
| JP | 2020035111 | A | * | 3/2020 | |
| JP | 2020137439 | A | * | 9/2020 | |
| JP | 2021036785 | A | * | 3/2021 | |
| WO | WO-2020039782 | A1 | * | 2/2020 | ........... G05D 1/0219 |
| WO | WO-2022065091 | A1 | * | 3/2022 | |

* cited by examiner

LAWN MOWER WITH AUTONOMOUS TRAVELING FUNCTION

CROSS REFERENCE TO RELATED APPLICATION

The present invention claims priority under 35 U.S.C. § 119 to Japanese Patent Application No. 2019-167771 filed on Sep. 13, 2019, the entire content of which is incorporated herein by reference.

TECHNICAL FIELD

The present disclosure relates to a lawn mower with an autonomous traveling function.

BACKGROUND

A lawn mower including a lawn mower machine driven to perform lawn mowing has conventionally been known. In addition, in such a lawn mower, a lawn mower whose wheels are driven by a traveling motor which is an electric motor is also considered.

For example, there is a lawn mower in which a user gets onboard and performs operations for driving and lawn mowing. This is called a riding lawn mower. Examples of lawn mower machines include lawn mowing rotary tools.

The riding lawn mower is used mainly in so-called off road areas such as in gardens, and moves on the ground surface for lawn mowing.

For example, U.S. Pat. No. 8,668,036 B2, US 2018/0326860 A1, and JP2019-88252 A disclose a riding lawn mower in which two wheels are driven by a traveling motor, and a lawn mower blade of a lawn mower machine is driven by a lawn mower motor. In addition, JP2019-88252 A also indicates that, in the riding lawn mower, a leaf colorimeter for lawn as an activity measuring instrument for detecting a lawn condition is provided on the front wall of the lawn mower machine in the traveling direction. A control unit generates a lawn condition by associating an activity level or the like obtained from the leaf colorimeter with a vehicle self-position and date and time data. JP 2019-88252 A indicates that, with this configuration, an activity distribution can be generated as lawn evaluation information for each map position. JP2019-88252 A further indicates that a camera is provided on the rear side of the lawn mower machine in the traveling direction to photograph the condition of a lawn surface mowed by the lawn mower machine. The photographed image acquired by the camera is processed by an image processor, and an image for confirming the condition after lawn mowing is generated.

In the riding lawn mower, a user has to ride and drive, which imposes a heavy burden on the user. Meanwhile, it is conceivable that the lawn mower that does not have a driver's seat will be equipped with a position acquirer that acquires vehicle self-position information so as to autonomously drive along a preset route. However, there is also a case where the user wants to get on the vehicle and work, and the degree of freedom of use is low. In addition, when the lawn mower is autonomously driven, depending on the acquired detection accuracy of the vehicle self-position, there are many cases where an unmowed portion of lawn may be left behind, or the vehicle travels on the mowed portion of lawn while mowing again, and therefore there is room for improvement in terms of improving work efficiency.

SUMMARY

The object of the present disclosure is to achieve a lawn mower with an autonomous traveling function, that can improve work efficiency without excessively enhancing the detection accuracy of a self-position, and that can perform both of traveling by the operation of a user on board and traveling by autonomously driving unmanned.

A lawn mower with an autonomous traveling function according to the present disclosure includes a traveling driver including a traveling motor configured to drive at least one wheel; a mower motor configured to drive at least one cutting blade; at least one controller configured to control the traveling driver in accordance with an operation of a user getting on the lawn mower, control the traveling driver to cause the lawn mower to travel autonomously, on a basis of information detected on the lawn mower, and control the mower motor; a lawn detection device configured to detect a condition of a portion of lawn on a front side in a traveling direction; and a position acquisition device configured to acquire self-position information. The at least one controller controls the traveling driver to cause the lawn mower to preferentially travel on a portion of lawn that needs to be mowed, on the basis of detection information acquired from the lawn detection device and the self-position information.

BRIEF DESCRIPTION OF DRAWINGS

Embodiment(s) of the present disclosure will be described based on the following figures, wherein.

DESCRIPTION OF EMBODIMENTS

Figure 1:
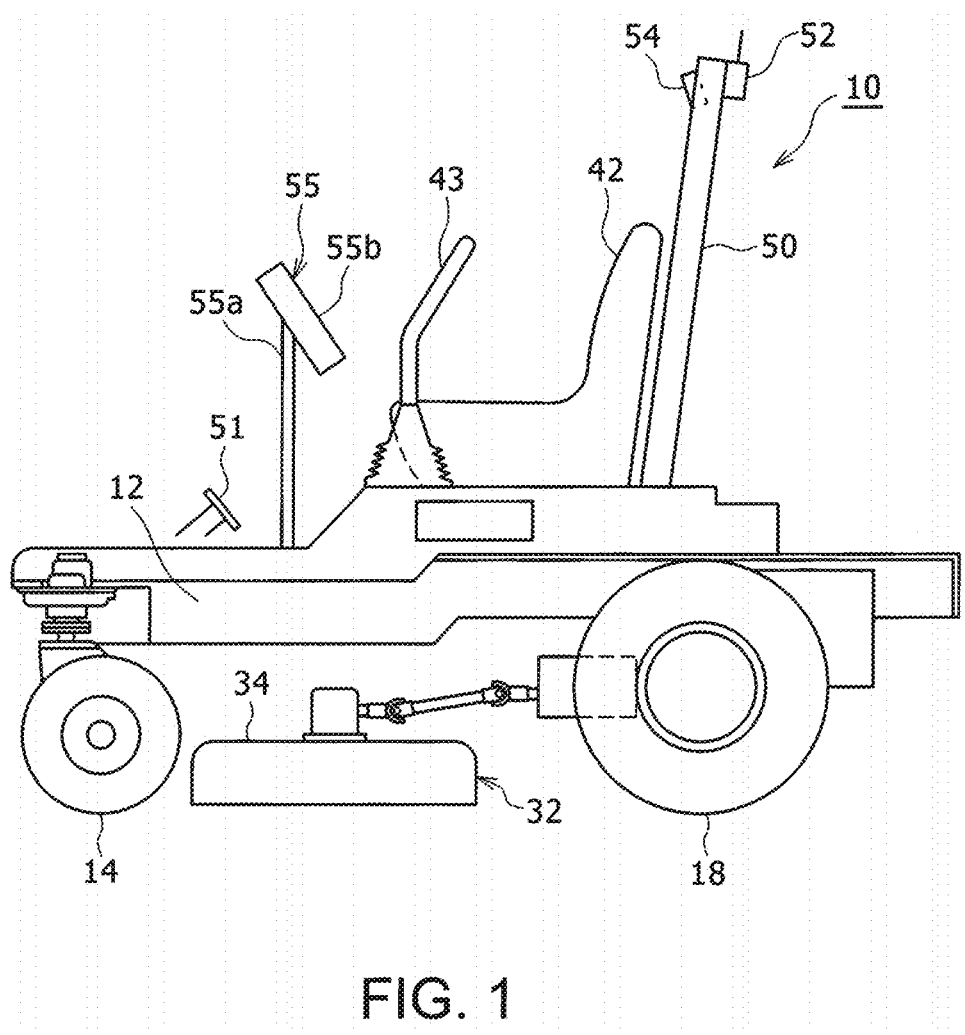
FIG. 1 is a schematic view of a lawn mower with an autonomous traveling function of an embodiment according to the present disclosure as viewed from one side in a width direction.

Hereinafter, an example of an embodiment will be described in detail with reference to the drawings. The drawings referred to in the embodiment are schematic, and thus the dimensions of components drawn in the drawings should be determined in consideration of the description below. The embodiment described below is an example, and the lawn mower with an autonomous traveling function of the present disclosure is not limited to this.

An embodiment of the present disclosure will be described below with reference to the drawings. The shapes and the number of pieces described below are examples for explanation, and can be appropriately changed in accordance with the specifications of a lawn mower with an autonomous traveling function. Hereinafter, the same components will be denoted by the same reference signs for explanation in all drawings.

Figure 2:
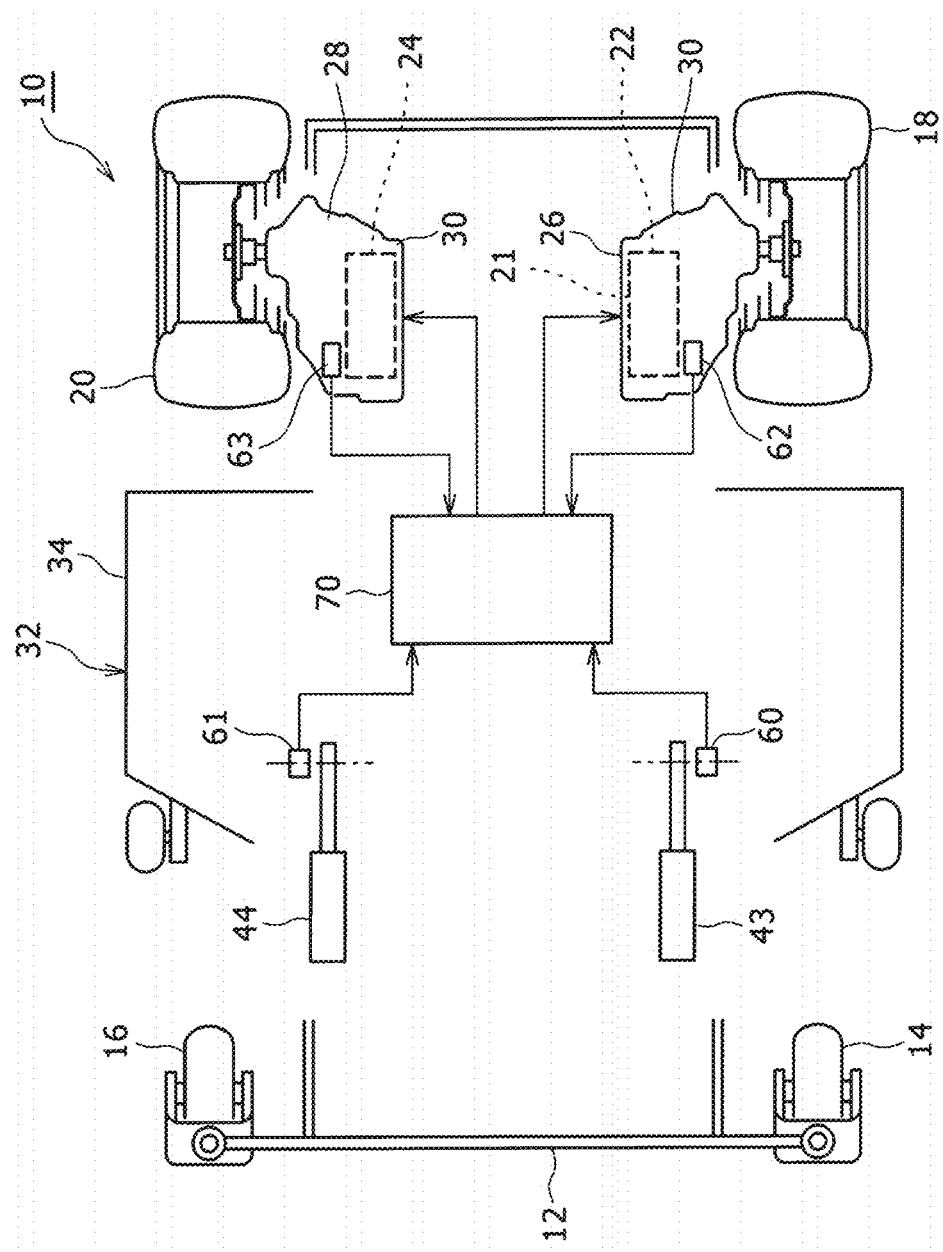
FIG. 2 is a schematic view of the lawn mower with an autonomous traveling function of FIG. 1 as seen from above.

FIGS. 1 to 5 illustrate an embodiment of the present disclosure. FIG. 1 is a schematic view of a lawn mower 10 with an autonomous traveling function of the embodiment as viewed from one side in a right-left direction that is a width direction. FIG. 2 is a schematic view of the lawn mower 10 with an autonomous traveling function as seen from above. In FIG. 1, a case is illustrated where two, right and left, operation levers 43 and 44 are included as a configuration having both functions of a turn instruction tool and an acceleration instruction tool. Hereinafter, the lawn mower 10 with an autonomous traveling function is referred to as the lawn mower 10.

As illustrated in FIGS. 1 and 2, the lawn mower 10 is an off-road vehicle suitable for lawn mowing, and includes two, right and left, caster wheels 14 and 16 and two, right and left, wheels 18 and 20 supported at positions separated from each other in the front-rear direction of a main frame 12 (right-left direction in FIG. 1). The two caster wheels 14 and 16 are front wheels and steering wheels. The two wheels 18 and 20 are rear wheels and main driving wheels. The two wheels 18 and 20 are independently driven by a left traveling motor 22 and a right traveling motor 24, respectively, which are two electric motors, right and left, for driving wheels. That is, the left traveling motor 22 is connected to the left wheel 18 via a power transmitter including a reduction gear mechanism (not illustrated) so as to transmit power, and the right traveling motor 24 is connected to the right wheel 20 via a power transmitter including a reduction gear mechanism (not illustrated) so as to transmit power. The left traveling motor 22 and the right traveling motor 24 form a traveling driver 21.

The two traveling motors 22 and 24 match the rotation speeds of the two wheels 18 and 20, thereby enabling straight travel of the lawn mower, and generate a difference in the rotation speeds between the two wheels 18 and 20, thereby enabling turning travel of the lawn mower. As described above, the lawn mower 10 includes the traveling motors 22 and 24 as drive sources. The reduction gear mechanism provided in the power transmitter uses, for example, single-stage or multiple-stage reduction gearing. In FIG. 2, two power generating units 26 and 28 are included corresponding to the two wheels 18 and 20, and the traveling motors 22 and 24 and the reduction gear mechanism are provided in a housing 30 constituting the respective power generating units 26 and 28. Each housing 30 is supported by the main frame 12. A configuration may be employed in which the power of the traveling motors 22 and 24 is transmitted to the wheels 18 and 20 not via the reduction gear mechanism and without deceleration. In addition, the caster wheels 14 and 16 enable free steering of more than 360 degrees about an axis in a vertical direction (an up and down direction in FIG. 1, a front and back direction of a paper of FIG. 2).

The lawn mower 10 incudes a lawn mower machine (mower) 32, which is a work machine supported on the lower side in the front-rear direction intermediate portion of the main frame 12. The lawn mower machine 32 includes one or more lawn cutting blades (not illustrated) that are lawn mowing rotary tools rotatable about an axis in the vertical direction inside a mower deck 34. The lawn cutting blade includes a plurality of cutting blade elements arranged around the axis in the vertical direction, and the cutting blade elements are rotated to thereby break and cut a lawn or the like.

Each of the abovementioned traveling motors 22 and 24 is driven by power supplied from a battery 36 (FIG. 3, etc.), which is a power source, via traveling inverters 38 and 40 (FIG. 3) described below. For example, each of the respective traveling motors 22 and 24 is a synchronous motor or induction motor driven by an AC power of three phases, or the like. The battery 36 is fixed to below or behind a driver's seat 42 described below in the main frame 12, for example. For the battery 36, a lead acid battery, a nickel metal hydride battery, a lithium battery, or the like may be employed, and the battery 36 has a voltage of, for example, 48 V. The battery 36 can also be charged from an external commercial AC power supply via a charger.

The motor shaft (not illustrated) of a mower motor 46 that is a corresponding electric motor (FIG. 3) is connected to the rotary shaft of the lawn cutting blades (not illustrated) provided inside the mower deck 34 in such a manner that power can be transmitted. One or more mower motors 46 can be provided depending on the number of the lawn cutting blades. Power is supplied to the mower motor 46 from the battery 36 (FIG. 3) via a mower inverter 48 (FIG. 3) described below and the mower motor 46 is driven. The mower motor 46 is, for example, a synchronous motor or induction motor driven by an AC power of three phases, or the like. With this, the mower motor 46 drives the lawn mower machine 32.

The lawn mower machine 32 mows a lawn by driving the mower motor 46, and discharges grass clippings from the mowed lawn from the inside of the lawn mower machine 32 to one side in the width direction of the lawn mower. It is possible to install a grass collection tank (not illustrated) on the lawn mower, and connect the grass collection tank and the lawn mower by a duct to collect the mowed grass clippings in the grass collection tank.

Moreover, as a lawn mowing rotary tool, in addition to the lawn cutting blade type, the lawn mower machine may have a reel type for lawn mowing that has a spiral blade on a cylinder having a rotary shaft parallel to the ground surface, for example, to pinch and mow a lawn or the like. The spiral blade is driven by a mower motor.

The driver's seat 42 on which the user sits is fixed to the upper side of the main frame of the lawn mower 10. In the main frame 12, a passenger protection frame 50 is fixed to the rear side of the driver's seat 42 so as to extend upward. A position acquisition device 52 serving as a satellite positioning device and a camera 54 are attached to the upper portion of the passenger protection frame 50. The satellite positioning device is used to acquire the position of the lawn mower itself by receiving radio waves from an artificial satellite with the use of a global positioning satellite system (GNSS) such as a GPS. The position acquisition device 52 includes an antenna that acquires radio waves from an artificial satellite used for GNSS, and acquires self-position information such as positioning data regarding a lawn mower self-position. The lawn mower position information is transmitted from the position acquisition device 52 to a second controller 80 (FIG. 3) described below.

Figure 3:
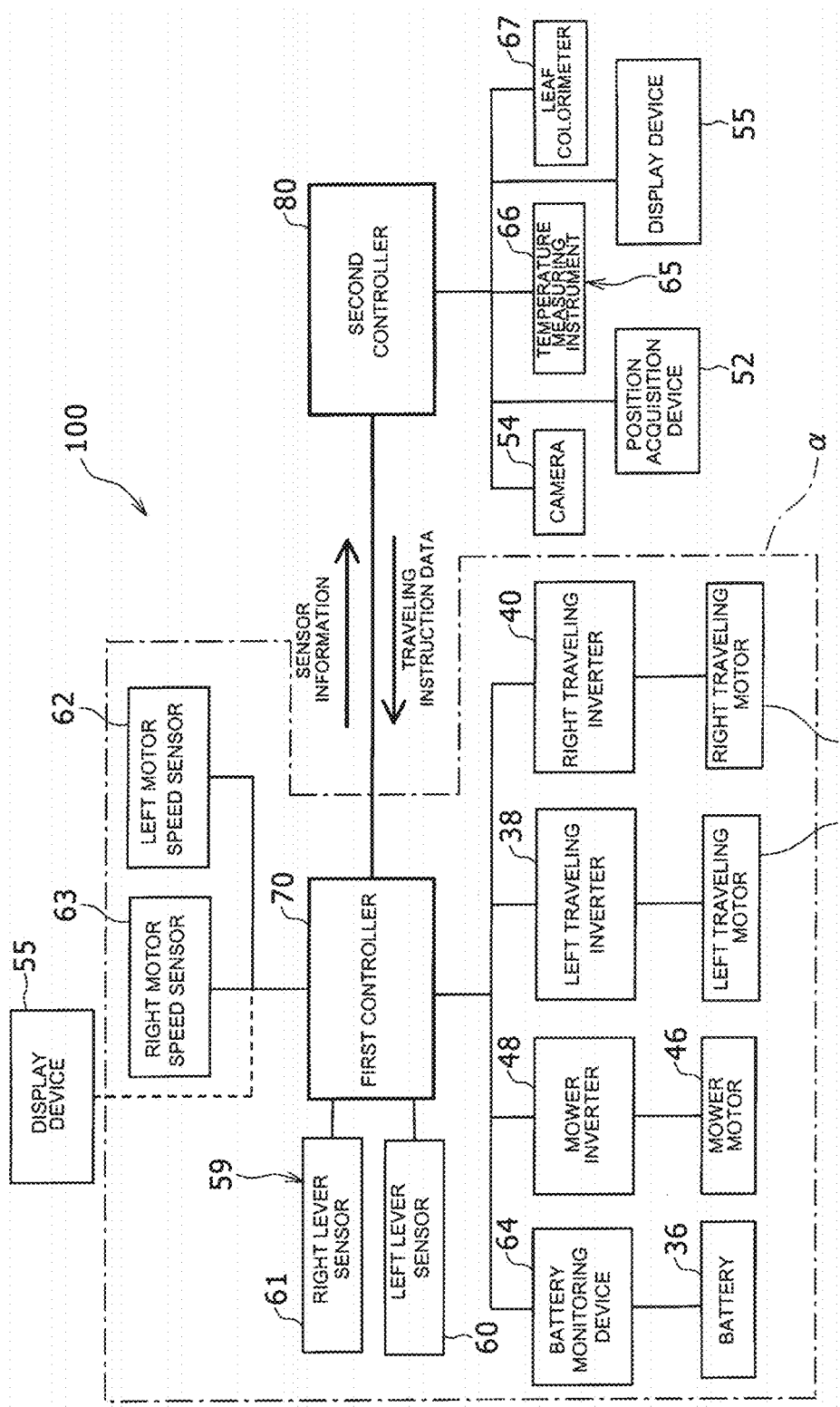
FIG. 3 is a block diagram illustrating a configuration of a control system in the lawn mower with an autonomous traveling function of FIG. 1.

The camera 54 photographs the condition of a lawn on the ground on the front side in the traveling direction of the lawn mower. In doing so, the camera 54 detects the condition of the lawn by detecting light from the lawn. The camera 54 corresponds to the lawn detection device. The photographed image acquired by the camera 54 is transmitted to the second controller 80 (FIG. 3).

In the main frame 12, a brake pedal 51 is disposed on the front side of the driver's seat 42. In the main frame 12, the left operation lever 43 and the right operation lever 44 that swing about a horizontal axis are supported on both sides in the right-left direction, which are both sides in the width direction of the driver's seat 42. Near the lower ends of the two right and left operation levers 43 and 44, a left lever sensor 60 and a right lever sensor 61 are provided to detect the operation amount and operation direction of the operation levers 43 and 44. The left lever sensor 60 detects the operation amount and operation direction of the left operation lever 43. The right lever sensor 61 detects the operation amount and operation direction of the right operation lever 44. A detection signal from each of the lever sensors 60 and 61 is transmitted to a first controller 70.

The first controller 70 calculates the rotation direction and the rotation speed of the corresponding traveling motors 22 and 24 on the basis of the operation amount and operation direction of the operation levers 43 and 44, and controls the corresponding traveling inverters 38 and 40 so as to drive the corresponding traveling motors 22 and 24 in accordance with the calculated rotation direction and rotation speed. For example, the rotation speed of the left wheel 18 is changed by the left operation lever 43, and the rotation speed of the right wheel 20 is changed by the right operation lever 44. By tilting the left operation lever 43 forward, the left wheel 18 rotates forward, and by tilting the left operation lever 43 backward, the left wheel 18 rotates backward. By tilting the right operation lever 44 forward, the right wheel 20 rotates forward, and by tilting the right operation lever 44 backward, the right wheel 20 rotates backward. As a result, the two wheels 18 and 20 are driven to rotate independently. The tilting amount of the two operation levers 43 and 44 is changed in the same direction to thereby generate a difference in the number of rotations between the two wheels 18 and 20, and thus the lawn mower can be turned.

Figure 5:
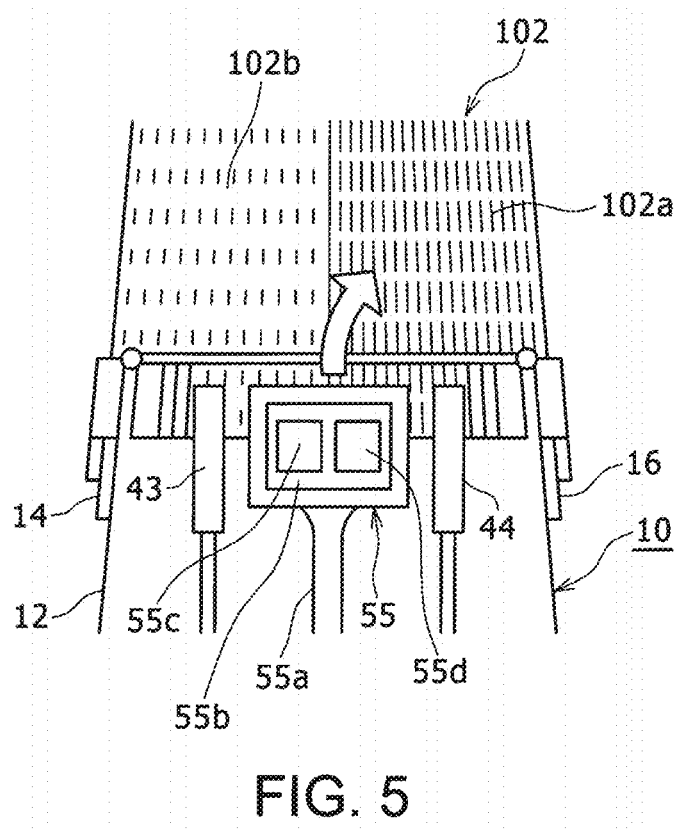
FIG. 5 is a diagram illustrating an example of a condition of a portion of lawn ahead in a traveling direction as seen from a driver's seat in the lawn mower with an autonomous traveling function of FIG. 1.

In the main frame 12, a pillar section 55a of a display device 55 is provided so as to stand upward on the front side of the driver's seat 42. A displayer 55b such as a liquid crystal screen of the display device 55 is fixed to an upper end portion of the pillar section 55a. As illustrated in FIG. 5 to be described below, the displayer 55b includes a map displayer 55c that includes a self-position and a sensor displayer 55d that displays detection information of a plurality of sensors. The display device 55 corresponds to the map outputter.

Such lawn mower 10 includes a function to control the traveling driver 21 in accordance with an operation of a user on board, a function to control the traveling driver 21 to cause the lawn mower to autonomously travel on the basis of information detected by the lawn mower, and a function to control the mower motor 46.

The first controller 70 and the second controller 80, which will be described below, control the traveling driver 21 in such a manner that the lawn mower preferentially travels on a lawn that needs to be mowed, on the basis of detection information acquired from the camera 54 and the self-position information acquired by the position acquisition device 52. As a result, as will be described below, it is possible to achieve the lawn mower 10 that can improve work efficiency without excessively enhancing the detection accuracy of the self-position, and that can perform both of traveling by the operation of the user on board and traveling by autonomously driving unmanned.

The first controller 70 and the second controller 80 (FIG. 3) are fixed to the main frame 12, for example, below the driver's seat 42.

FIG. 3 is a block diagram illustrating a configuration of a control system 100 of the lawn mower 10. The control system 100 is configured to include the first controller 70, the second controller 80, a first sensor group 59, a second sensor group 65, the traveling driver 21, the mower motor 46, a battery monitoring device 64, the camera 54, the position acquisition device 52, and the display device 55.

The first controller 70 is configured to implement a function of traveling in accordance with the operation of the user on board the lawn mower without using the second controller 80. To achieve this, the first sensor group 59, the left traveling inverter 38, the right traveling inverter 40, the mower inverter 48, and the battery monitoring device 64 are communicably connected to the first controller 70. The first controller 70 includes a CPU which is an arithmetic processor, and a storage such as a RAM and a ROM. The CPU has a function to read and execute programs and the like stored in advance in the storage. The storage has a function to temporarily store the read programs and processing data, and a function to store a control program or the like in advance. The arithmetic processor may be of any type so long as it can implement a function by executing a program.

The first sensor group 59 is configured to include the left lever sensor 60, the right lever sensor 61, a left motor speed sensor 62, and a right motor speed sensor 63. The left motor speed sensor 62 detects a rotation speed of the left traveling motor 22. The right motor speed sensor 63 detects a rotation speed of the right traveling motor 24. The rotation speed of each of the traveling motors 22 and 24 may be the number of rotations of the traveling motors 22 and 24 per unit time (for example, one minute). Each of the motor speed sensors 62 and 63 is configured to include, for example, a resolver. The detection signal of each of the motor speed sensors 62 and 63 is input to the first controller 70.

The first controller 70 calculates an actual lawn mower speed of the lawn mower in accordance with the detection signals of the left motor speed sensor 62 and the right motor speed sensor 63. As an alternative to each of the motor speed sensors 62 and 63, a rotation angle sensor that detects a rotation angle of each of the traveling motors 22 and 24 may be provided, and the detection signal of the rotation angle sensor may be input to the first controller 70. The first controller 70 calculates the rotation speed of each of the traveling motors 22 and 24 and the actual lawn mower speed, from the detection signal.

Figure 4:
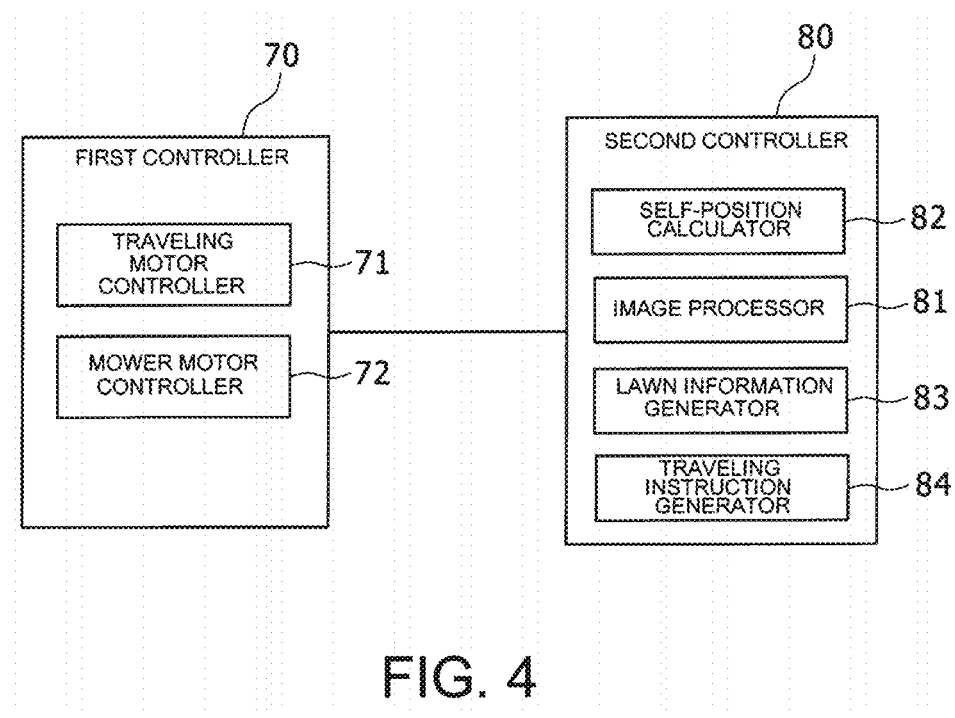
FIG. 4 is a block diagram illustrating a configuration by extracting a first controller and a second controller from FIG. 3.

FIG. 4 is a block diagram illustrating the configuration by extracting the first controller 70 and the second controller 80 from FIG. 3. The first controller 70 includes a traveling motor controller 71 and a mower motor controller 72. The traveling motor controller 71 calculates a target rotation direction and a target rotation speed of the left traveling motor 22 in accordance with the detection signal of the left lever sensor 60, and controls the driving of the left traveling inverter 38 to thereby cause the left traveling motor 22 to be driven at the target rotation speed in the target rotation direction. In addition, the traveling motor controller 71 calculates a target rotation direction and a target rotation speed of the right traveling motor 24 in accordance with the detection signal of the right lever sensor 61, and controls the driving of the right traveling inverter 40 to thereby cause the right traveling motor 24 to be driven at the target rotation speed in the target rotation direction. As a result, the traveling motor controller 71 has a function to control the traveling driver 21 in accordance with the operation of the user on board.

DC power is supplied to each of the traveling inverters 38 and 40 from the battery 36, and the traveling inverters 38 and 40 supply AC power to the traveling motors 22 and 24 respectively.

The mower motor controller 72 drives the mower motor 46 at a preset number of rotations via the mower inverter 48 when a deck switch (not illustrated) provided in the lawn mower is turned on. In doing so, the mower inverter 48 drives the mower motor 46.

The battery monitoring device 64 illustrated in FIG. 3 is attached to the battery 36, detects an input/output current and a battery voltage of the battery 36 to thereby monitor a status of the battery 36, and inputs the detection signal to the first controller 70. The battery monitoring device 64 may detect the temperature of the battery 36. The first controller 70 limits the driving of each of the traveling motors 22 and 24 and the mower motor 46 in accordance with the status of the battery 36. For example, if the battery 36 is overcharged or over-discharged or the temperature of the battery rises excessively, the first controller 70 stops or lowers the upper speed limit of each of the traveling motors 22 and 24 and the motor 46.

The first controller 70 transmits to the second controller 80 detection information of each sensor input to the first controller 70. The first controller 70 and the second controller 80 are communicably connected by a CAN-bus communication method. In FIG. 2, the illustration of the second controller 80 is omitted.

The second controller 80 is additionally connected to the first controller 70 in order for the lawn mower to travel by autonomously driving unmanned. The camera 54, the position acquisition device 52, the display device 55, and the second sensor group 65 are communicably connected to the second controller 80. The second controller 80 includes a CPU which is an arithmetic processor, and a storage such as a RAM and a ROM. The CPU has a function to read and execute programs and the like stored in advance in the storage. The storage has a function to temporarily store the read programs and processing data, and a function to store a control program or the like in advance. The arithmetic processor may be of any type so long as it can implement a function by executing a program.

As illustrated in FIG. 4, the second controller 80 includes an image processor 81, a self-position calculator 82, a lawn information generator 83, and a traveling instruction generator 84. The image processor 81 processes a photographed image input from the camera 54 to the second controller 80, and in the image photographed by the camera 54, distinguishes between a lawn portion before mowing and a lawn portion after mowing.

FIG. 5 is a diagram illustrating an example of a condition of a lawn ahead in the traveling direction of the lawn mower in the image photographed by the camera 54 in the lawn mower 10. The white arrow in FIG. 5 is added in order to facilitate understanding. In FIG. 5, there is a long portion of lawn 102a before mowing on the right side of the lawn 102 ahead in the traveling direction of the lawn mower, and a short portion of lawn 102b after mowing on the left side. As can be seen from this, when there is the portion of lawn 102a before mowing and the portion of lawn 102b after mowing, the portion of lawn 102a before mowing has a darker green color than the portion of lawn 102b after mowing, for example. The image processor 81 (FIG. 4) can distinguish the portion of lawn 102a before mowing and the portion of lawn 102b after mowing from the photographed image in accordance with such color difference. In addition, the image processor 81 may be configured to fetch and store a photographed image of the portion of lawn 102b in a state where the portion of lawn 102b after mowing has been present ahead in the traveling direction of the lawn mower in advance, and to compare the color of the stored photographed image with the color of the current photographed image photographed by the camera 54, thereby determining whether the portion of lawn ahead in the traveling direction of the lawn mower is after or before being mowed.

Referring back to FIG. 4, the self-position calculator 82 calculates a self-position on the basis of the self-position information from the position acquisition device 52. The self-position calculator 82 stores map data in advance. The self-position calculator 82 combines map data and the self-position.

The displayer 55b (FIG. 5) of the display device 55 can display an image including the self-position on the map and the planned traveling range. For example, the map displayer 55c on one side in the right-left direction of the displayer 55b illustrated in FIG. 5 displays a map image including the self-position and the planned traveling range. The planned traveling range is preset by the user. For example, the displayer 55b of the display device 55 is configured to include a touch panel, and the planned traveling range can be set in advance by a touch operation on the touch panel by the user. The sensor displayer 55d on the other side in the right-left direction of the displayer 55b displays a sensor image including detection information by a sensor.

Referring back to FIG. 3, the second sensor group 65 is configured to include a temperature measuring instrument 66, and a leaf colorimeter 67 as an activity measuring instrument. For example, the temperature measuring instrument 66 is fixed to the main frame 12 on the front side in the traveling direction with respect to the lawn mower machine 32. The temperature measuring instrument 66 measures the surface temperature and the ambient temperature of a portion of lawn. The measurement value of the temperature measuring instrument 66 is input to the second controller 80.

The leaf colorimeter 67 measures activity of a portion of lawn from a reflectance of light in a visible red region and an infrared region. For example, the leaf colorimeter 67 is fixed to the main frame 12 on the front side in the traveling direction with respect to the lawn mower machine 32. The leaf colorimeter 67 illuminates the lawn with the use of an optical beam in a visible red region of 660 nm to an infrared region of 850 nm and analyzes the reflected light by a spectrum analysis to output an NVDI (normalized vegetation index) and a reflectance. The leaf colorimeter 67 calculates the activity of the lawn from the output such as the NVDI.

The lawn information generator 83 illustrated in FIG. 4 associates the measurement information of the leaf colorimeter 67 and the temperature measuring instrument 66 with the self-position information to generate lawn condition information. The generated lawn condition information may be displayed on the displayer 55b of the display device 55.

The traveling instruction generator 84 generates a traveling instruction in such a manner that the lawn mower preferentially travels on a portion of lawn that needs to be mowed within a planned traveling range set in advance, on the basis of photographed image information based on the detection information acquired from the camera 54 and a calculation result of the self-position based on the self-position information acquired from the position acquisition device 52. In doing so, the traveling instruction generator 84 generates the traveling instruction in such a manner that the lawn mower reciprocates while shifting to one side in the right-left direction so as to pass through the entire planned traveling range and gradually remove the portion of lawn that needs to be mowed toward one side in the right-left direction. For example, in the case of FIG. 5, the portion of lawn on the right side needs to be mowed, and thus the traveling instruction generator 84 generates the travel instruction in such a manner that the lawn mower is turned toward the right so as to preferentially travel on the right side of FIG. 5, and then the lawn mower is moved straight ahead. The generated traveling instruction is transmitted from the second controller 80 to the first controller 70 as traveling instruction data. For example, the traveling instruction data includes a target turning radius, a target lawn mower speed, and the like. In addition, the second controller 80 may generate an on/off switching command for the mower motor 46 and transmit the switching command to the first controller 70. Moreover, the lawn condition information generated by the second controller 80 may be transmitted to the first controller 70.

The traveling motor controller 71 of the first controller 70 controls the traveling driver 21 via the traveling inverters 38 and 40 in accordance with the received traveling instruction to cause the lawn mower to travel autonomously. In doing so, the lawn mower may be equipped with a selector switch (not illustrated), and the user may switch between causing the lawn mower to travel autonomously on the basis of the traveling instruction from the second controller 80 and causing the lawn mower to travel by a manual operation in accordance with the driving operation of the user sitting in the driver's seat 42. When the displayer 55b of the display device 55 includes a touch panel, a configuration may be employed in which autonomous traveling and manual operation traveling are switched by a touch operation on the touch panel. As a result, the first controller 70 and the second controller 80 control the traveling driver 21 in such a manner that the lawn mower preferentially travels on a portion of lawn that needs to be mowed, on the basis of the detection information acquired from the camera 54 and the self-position information acquired by the position acquisition device 52.

According to the abovementioned lawn mower 10, the first controller 70 and the second controller 80 control the traveling driver 21 in such a manner that the lawn mower 10 preferentially travels on a portion of lawn that needs to be mowed, on the basis of the detection information acquired from the camera 54 and the self-position information acquired by the position acquisition device 52. As a result, it is possible to achieve the lawn mower 10 that can improve work efficiency without excessively enhancing the detection accuracy of the self-position, and that can perform both of traveling by the operation of the user on board the driver's seat 42 and traveling by autonomously driving unmanned.

In addition, the first controller 70 is communicably connected to the traveling inverters 38 and 40 and has a function to control the traveling driver 21 in accordance with the operation of the user on board. Moreover, the second controller 80 is communicably connected to the camera 54 and the position acquisition device 52, and transmits a traveling instruction to the first controller 70 in such a manner that the lawn mower preferentially travels on a portion of lawn that needs to be mowed, on the basis of the detection information acquired from the camera 54 and the self-position information. Furthermore, the first controller 70 controls the traveling driver 21 in accordance with the traveling instruction. As a result, the lawn mower 10 can be configured by incorporating parts such as the second controller 80, the camera 54 connected to the second controller 80, and the position acquisition device 52 into an existing riding lawn mower that includes the first controller 70 and parts such as the sensors 60, 61, 62, and 63 connected to the first controller 70 (parts within the dash-dotted line a in FIG. 3). Therefore, the structure and parts of the existing riding lawn mower can be widely used, and the cost of the lawn mower 10 can be reduced. In addition, in the manufacturer of the above existing riding lawn mower, it is also possible to combine the lawn mower with the second controller 80 manufactured by another company and the parts connected to the second controller 80. Moreover, by sharing the functions between the first controller 70 and the second controller 80, it is not necessary to excessively enhance the calculation performance and memory capacity of each of the controllers 70 and 80. This can reduce the load imposed on each of the controllers 70 and 80.

The display device is not necessarily connected to the second controller 80, but instead, the display device 55 may be connected to the first controller 70 as illustrated by the broken line in FIG. 3 and the necessary information may be displayed by the display device 55.

Figure 6:
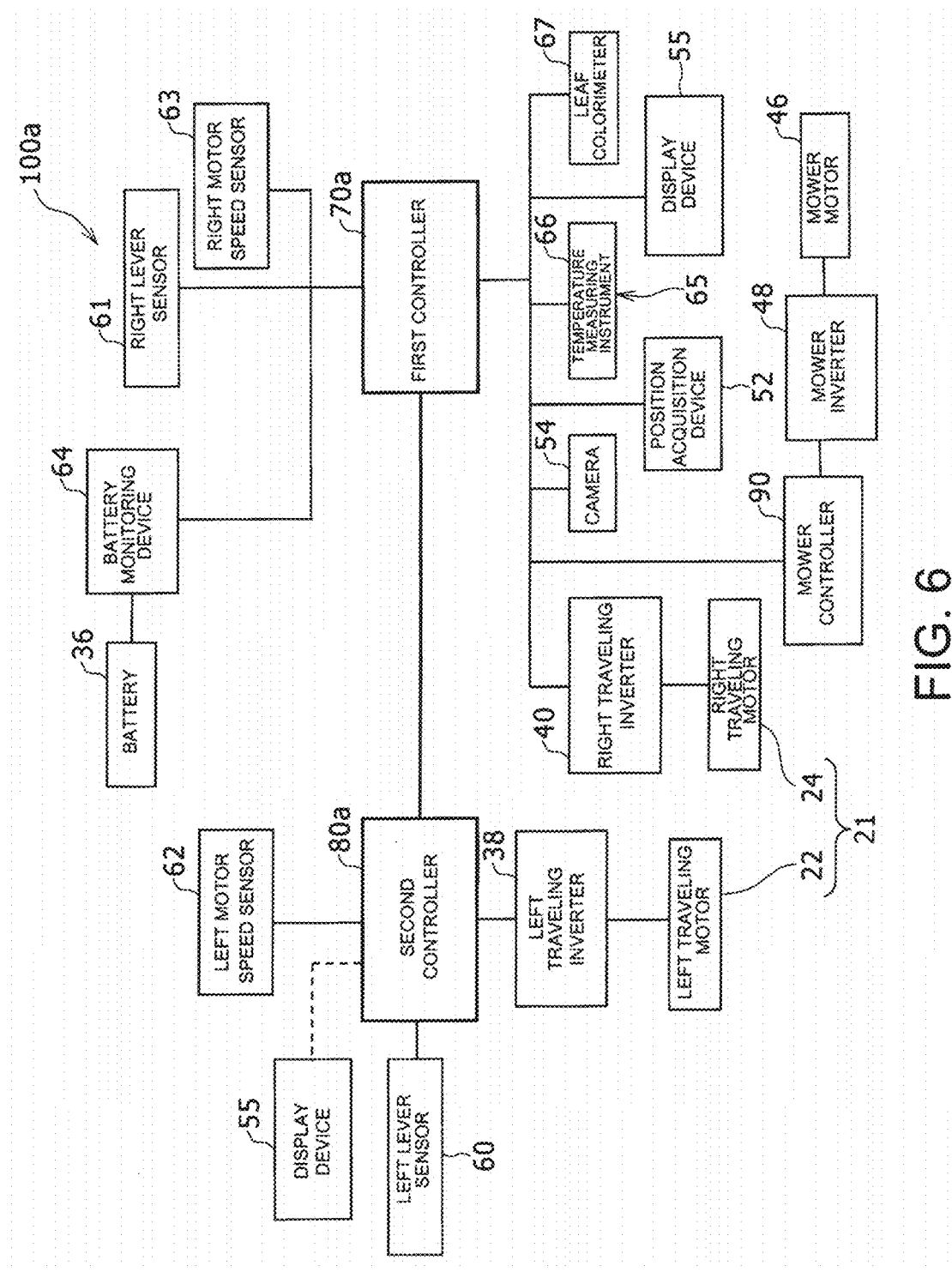
FIG. 6 is a block diagram illustrating a configuration of a control system in a lawn mower with an autonomous traveling function of another example of the embodiment according to the present disclosure.
Figure 7:
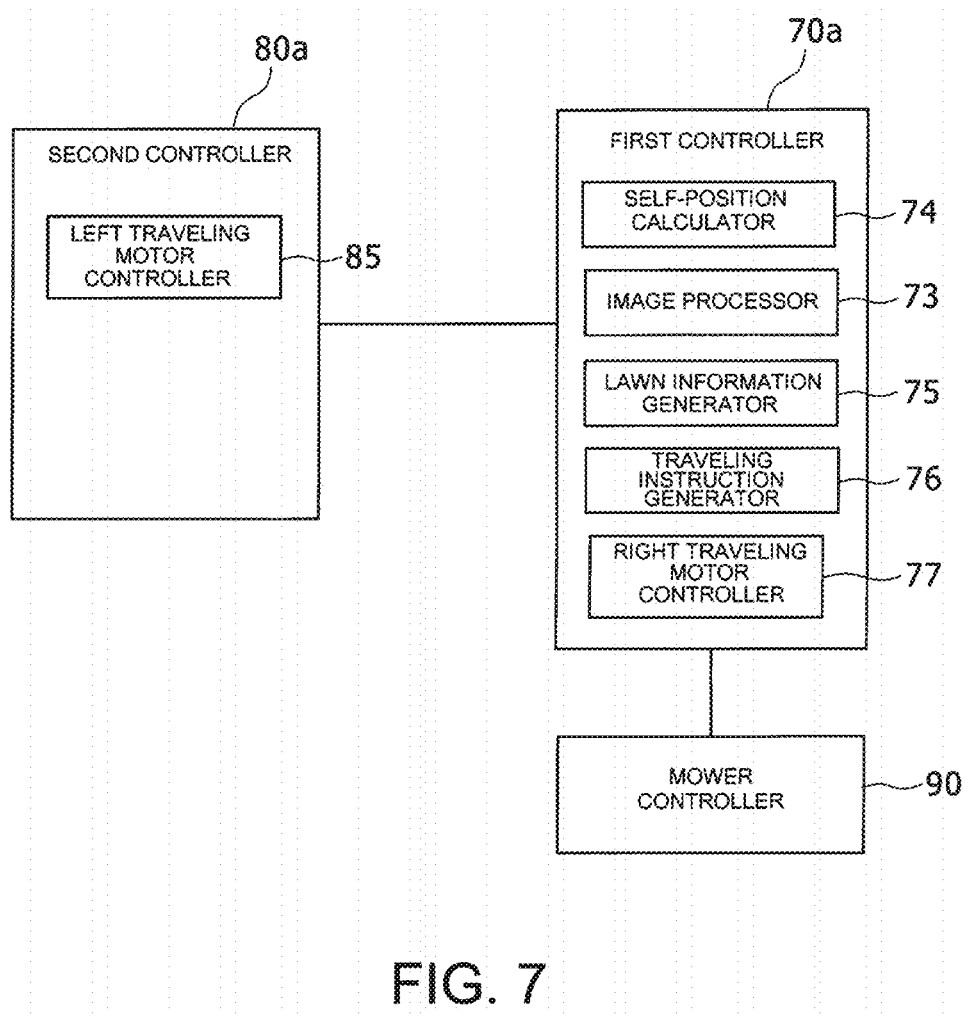
FIG. 7 is a block diagram illustrating a configuration by extracting a first controller, a second controller, and a mower controller from FIG. 6.

FIG. 6 is a block diagram illustrating a configuration of a control system 100a in a lawn mower of another example of the embodiment. FIG. 7 is a block diagram illustrating a configuration by extracting a first controller 70a, a second controller 80a, and a mower controller 90 from FIG. 6. In the lawn mower of this example, it is necessary to use both the first controller 70a and the second controller 80a in order to implement a function to be able to travel in accordance with the operation of the user on board the lawn mower.

Specifically, the right traveling motor 24 is connected to the first controller 70a via the right traveling inverter 40. The right traveling motor 24 corresponds to the first traveling motor. The first controller 70 can control the driving of the right traveling motor 24 via the right traveling inverter 40 in accordance with a detection signal from the right lever sensor 61.

The left traveling motor 22 as the second traveling motor is connected to the second controller 80a via the left traveling inverter 38. The left traveling motor 22 corresponds to the second traveling motor. The second controller 80a controls the driving of the left traveling motor 22 via the left traveling inverter 38 in accordance with a detection signal from the left lever sensor 60.

In addition, the mower controller 90 is connected to the first controller 70a, and the first controller 70a controls the mower controller 90. The mower controller 90 controls the driving of the mower motor 46 via the mower inverter 48. With this, the first controller 70a controls the mower motor 46 via the mower controller 90.

The camera 54, the position acquisition device 52, the second sensor group 65, the display device 55, the right motor speed sensor 63, the right lever sensor 61, and the battery monitoring device 64 are communicably connected to the first controller 70*a*. The left motor speed sensor 62 and the left lever sensor 60 are communicably connected to the second controller 80*a*.

The second controller 80*a* is communicably connected to the first controller 70*a*. As illustrated in FIG. 7, the first controller 70*a* includes an image processor 73, a self-position calculator 74, and a lawn information generator 75, a traveling instruction generator 76, and a right traveling motor controller 77. The functions of the image processor 73, the self-position calculator 74, and the lawn information generator 75 are respectively the same as the functions of the image processor 81, the self-position calculator 82, and the lawn information generator 83 illustrated in FIG. 4. The traveling instruction generator 76 generates a traveling instruction in such a manner that the lawn mower preferentially travels on a portion of lawn that needs to be mowed, on the basis of the detection information acquired from the camera 54 and the self-position information acquired from the position acquisition device 52. The right traveling motor controller 77 controls the driving of the right traveling motor 24 in accordance with the traveling instruction. Along with that, the traveling instruction generated by the first controller 70*a* is transmitted to the second controller 80*a*.

The second controller 80*a* includes a left traveling motor controller 85. The left traveling motor controller 85 controls the driving of the left traveling motor 22 in accordance with the traveling instruction generated by the first controller 70*a*. With this, the first controller 70*a* controls the left traveling motor 22 via the second controller 80*a*. In the configurations of FIGS. 6 and 7, the left traveling motor 22 serving as the first traveling motor, the left motor speed sensor 62, and the left lever sensor 60 may be connected to the first controller 70*a*, and the right traveling motor 24 serving as the second traveling motor, the right motor speed sensor 63, and the right lever sensor 61 may be connected to the second controller 80*a*.

In the case of this example as well, similar to the configurations of FIGS. 1 to 5, it is possible to achieve a lawn mower that can improve work efficiency without excessively enhancing the detection accuracy of the self-position, and that can perform both of traveling by the operation of the user on board the driver's seat and traveling by autonomously driving unmanned. In addition, since the functions are shared between the first controller 70*a* and the second controller 80*a*, the load on each of the controllers 70*a* and 80*a* can be reduced. In this example, other configurations and actions are the same as those in FIGS. 1 to 5.

Figure 8:
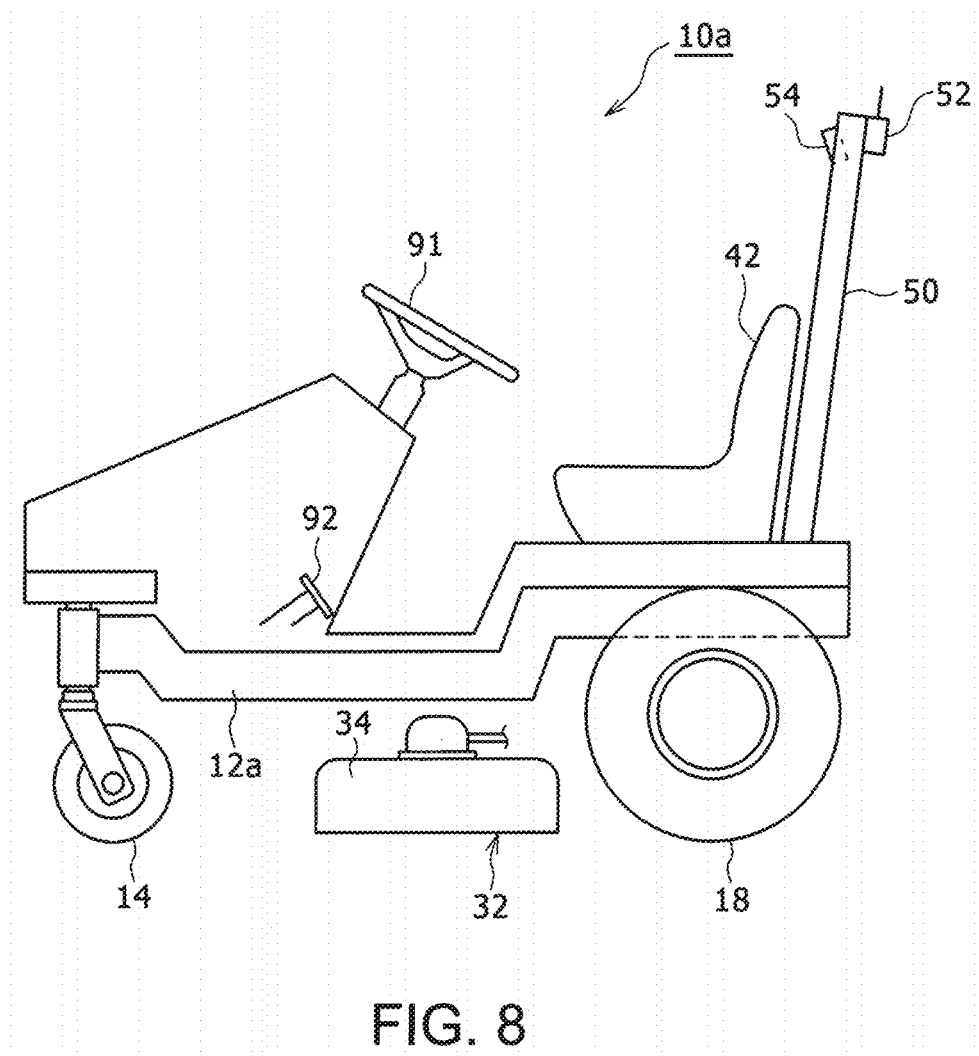
FIG. 8 is a schematic view of a lawn mower with an autonomous traveling function of another example of the embodiment according to the present disclosure as viewed from one side in a width direction.
Figure 9:
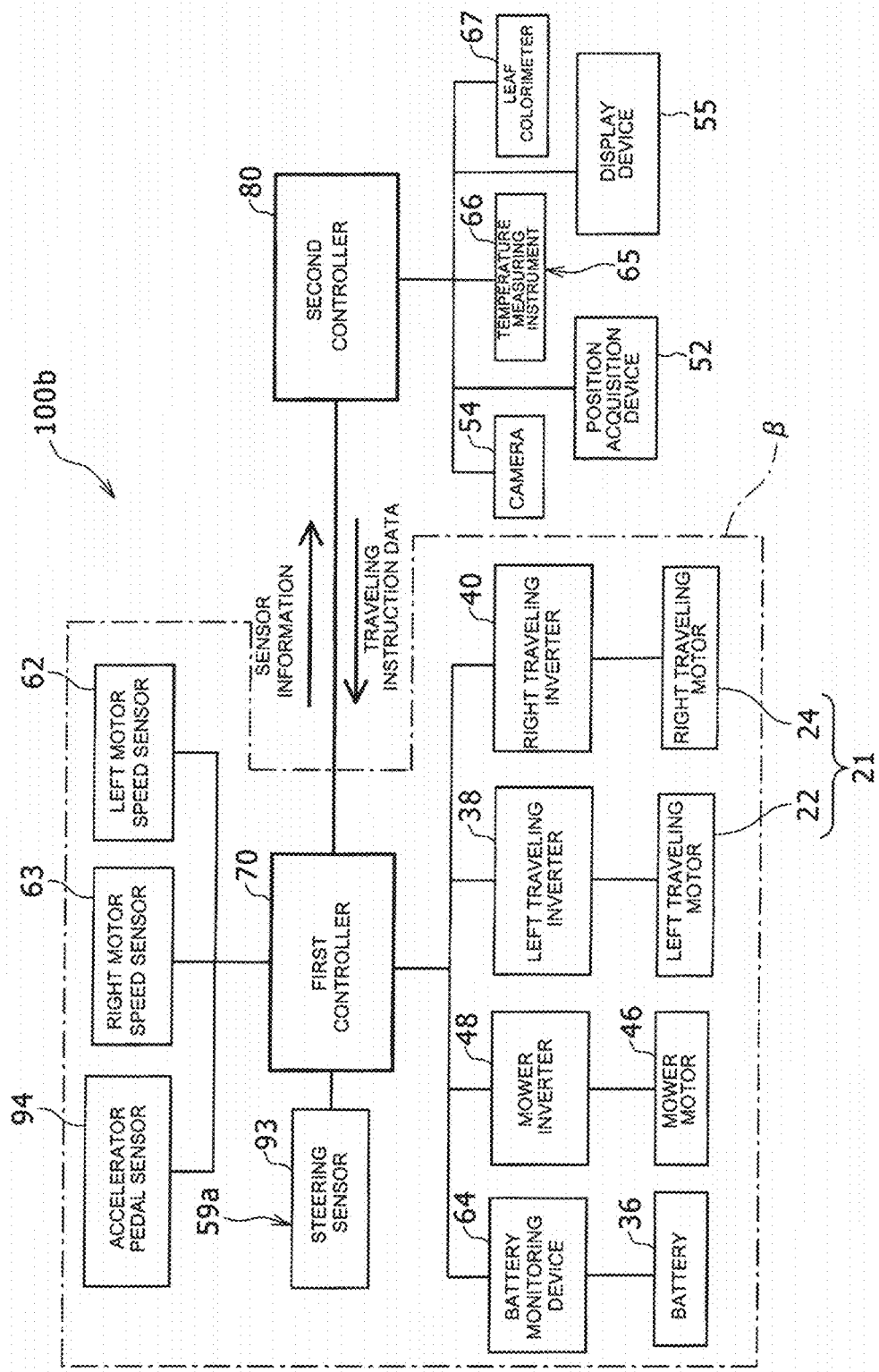
FIG. 9 is a block diagram illustrating a configuration of a control system in the lawn mower with an autonomous traveling function of FIG. 8.

FIG. 8 is a schematic view of a lawn mower 10*a* of another example of the embodiment according to the present disclosure as viewed from one side in the right-left direction. FIG. 9 is a block diagram illustrating a configuration of a control system 100*b* in the lawn mower 10*a* of FIG. 8. In the case of each of the above examples, a case where the lawn mower includes two right and left operation levers 43 and 44 as a configuration having both functions of a turn instruction tool and an acceleration instruction tool has been described. Meanwhile, the lawn mower 10*a* of this example does not include an operation lever, but instead includes a steering operation element 91 as a turn instruction tool and an accelerator pedal 92 as an acceleration instruction tool. In FIG. 8, the illustrations of the brake pedal and the display device are omitted.

The steering operation element 91 is provided on the front side of the driver's seat 42 so as to be able to turn. The accelerator pedal 92 is provided on the front side of the driver's seat 42 above a main frame 12*a*. The steering direction and the operation angle with respect to the neutral position of the steering operation element 91 are detected by a steering sensor 93 (FIG. 9). The detection signal of the steering sensor 93 is input to the first controller 70. The operation amount of the accelerator pedal 92 is detected by an accelerator pedal sensor 94 (FIG. 9). The detection signal of the accelerator pedal sensor 94 is also input to the first controller 70. A first sensor group 59*a* is configured to include the above steering sensor 93 and the accelerator pedal sensor 94, and the left motor speed sensor 62 and the right motor speed sensor 63.

The traveling motor controller of the first controller 70 calculates the target rotation speeds of the right and left traveling motors 22 and 24 in order to cause the lawn mower to travel at a speed corresponding to a corresponding direction, in accordance with the detection signals of the steering sensor 93 and the accelerator pedal sensor 94. The traveling motor controller controls the traveling motors 22 and 24 via the corresponding inverters 38 and 40 so as to drive the traveling motors 22 and 24 at the target rotation speeds.

In the case of this example as well, similar to the configurations of FIGS. 1 to 5, the lawn mower 10 can be configured by incorporating parts such as the second controller 80, the camera 54 connected to the second controller 80, and the position acquisition device 52 into an existing riding lawn mower that includes the first controller 70 and parts such as sensors connected to the first controller 70 (parts within the chain line (3 in FIG. 9). Therefore, the structure and parts of the existing riding lawn mower can be widely used, and the cost of the lawn mower 10*a* can be reduced. In addition, by sharing the functions between the first controller 70 and the second controller 80, the load on each of the controllers 70 and 80 can be reduced. In this example, other configurations and actions are the same as those in FIGS. 1 to 5.

Figure 10:
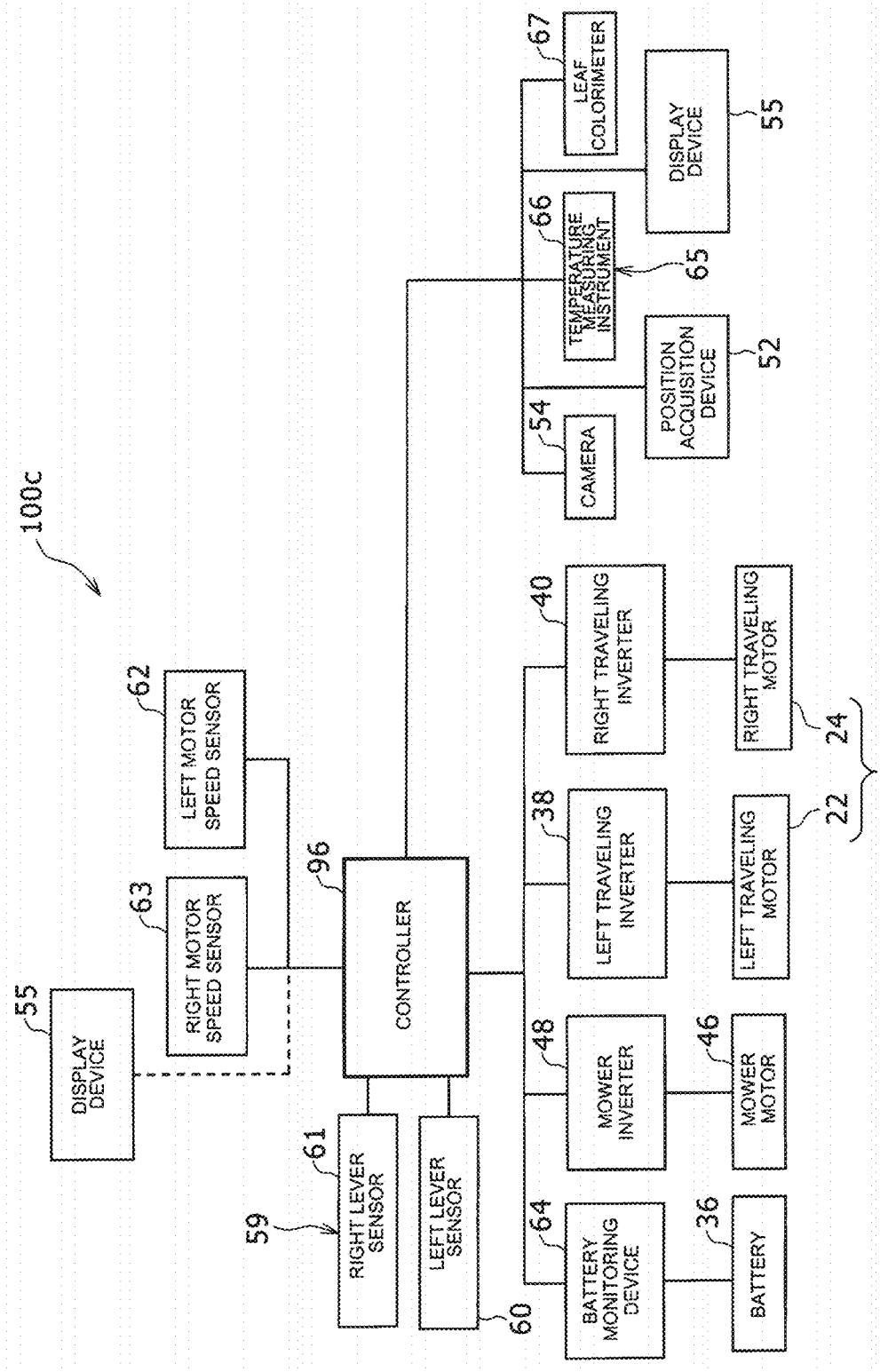
FIG. 10 is a block diagram illustrating a configuration of a control system in a lawn mower with an autonomous traveling function of another example of the embodiment.

FIG. 10 is a block diagram illustrating a configuration of a control system 100*c* in a lawn mower of another example of the embodiment. The control system 100*c* included in the lawn mower of this example includes one controller 96 having the functions of both the first controller 70 and the second controller 80 as an alternative to the first controller 70 and the second controller 80 in the configurations of FIGS. 1 to 5.

Specifically, the right traveling motor 24 is connected to the controller 96 via the right traveling inverter 40, the left traveling motor 22 is connected to the controller 96 via the left traveling inverter 38, and the mower motor 46 is connected to the controller 96 via the mower inverter 48. The battery monitoring device 64, the first sensor group 59, the camera 54, the position acquisition device 52, the second sensor group 65, and the display device 55 are communicably connected to the controller 96.

The controller 96 generates a traveling instruction in such a manner that the lawn mower preferentially travels on a portion of lawn that needs to be mowed, on the basis of the detection information acquired from the camera 54 and the self-position information acquired by the position acquisition device 52. The controller 96 controls the traveling driver 21 in accordance with the traveling instruction.

With the configuration of this example, the number of controllers can be reduced as compared to the configurations of FIGS. 1 to 5. Even with the configuration of this example, similar to the configuration of the abovementioned each example, it is possible to achieve a lawn mower that can improve work efficiency without excessively enhancing the detection accuracy of the self-position, and that can perform both of traveling by the operation of the user on board the driver's seat 42 (FIG. 1) and traveling by autonomously driving unmanned. In this example, other configurations and actions are the same as those in FIGS. 1 to 5.

Figure 11:
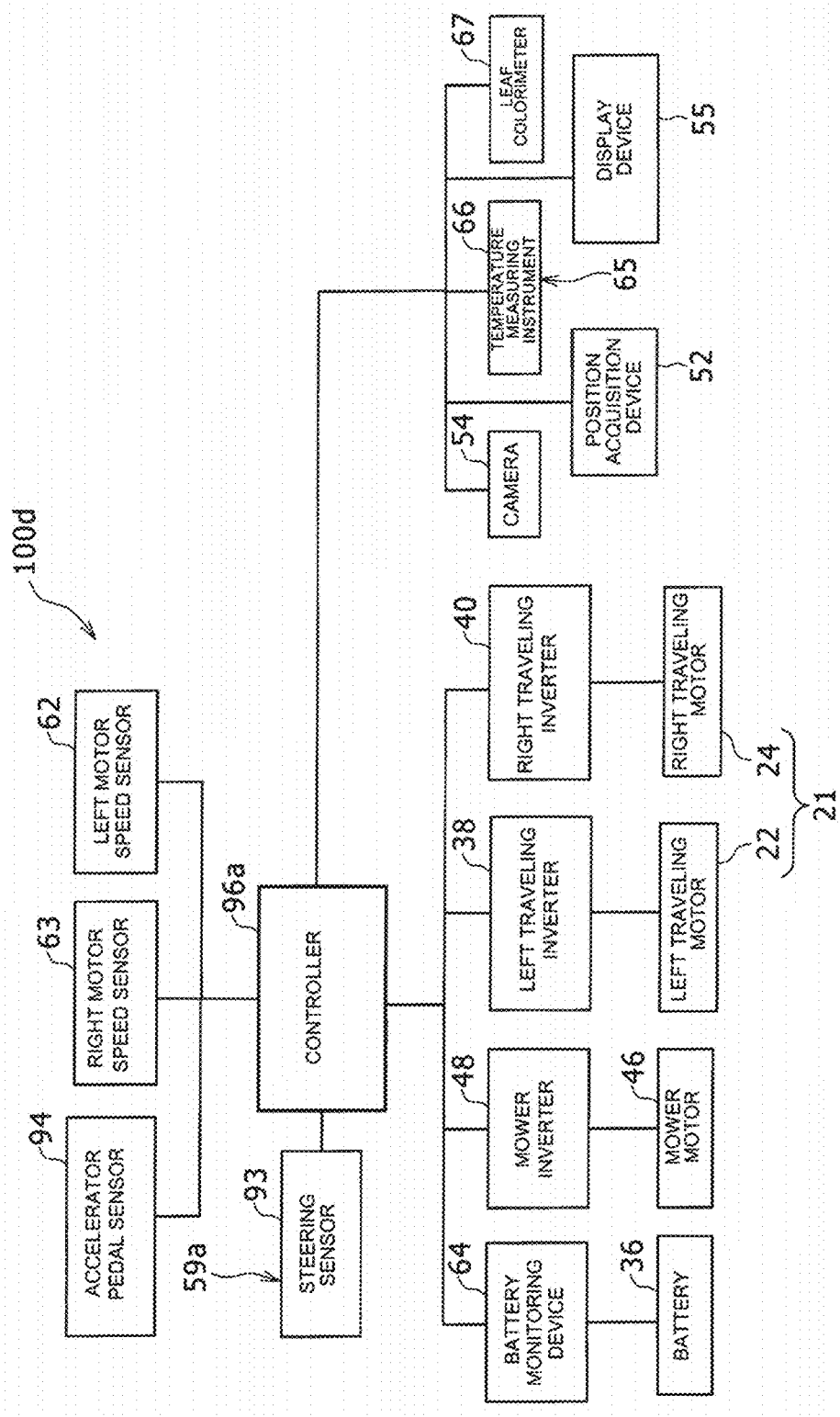
FIG. 11 is a block diagram illustrating a configuration of a control system in a lawn mower with an autonomous traveling function of another example of the embodiment.

FIG. 11 is a block diagram illustrating a configuration of a control system 100*d* in a lawn mower of another example of the embodiment. The control system 100*d* included in the lawn mower of this example includes one controller 96*a* having the functions of both the first controller 70 and the second controller 80 as an alternative to the first controller 70 and the second controller 80 in the configurations of FIGS. 8 and 9.

Specifically, the right traveling motor 24 is connected to the controller 96*a* via the right traveling inverter 40, the left traveling motor 22 is connected to the controller 96*a* via the left traveling inverter 38, and the mower motor 46 is connected to the controller 96*a* via the mower inverter 48. The battery monitoring device 64, the first sensor group 59*a*, the camera 54, the position acquisition device 52, the second sensor group 65, and the display device 55 are communicably connected to the controller 96*a*.

The controller 96*a* generates a traveling instruction in such a manner that the lawn mower preferentially travels on a portion of lawn that needs to be mowed, on the basis of the detection information acquired from the camera 54 and the self-position information acquired by the position acquisition device 52. The controller 96*a* controls the traveling driver 21 in accordance with the traveling instruction.

With the configuration of this example, the number of controllers can be reduced as compared to the configurations of FIGS. 8 and 9. Even with the configuration of this example, similar to the configuration of the abovementioned each example, it is possible to achieve a lawn mower that can improve work efficiency without excessively enhancing the detection accuracy of the self-position, and that can perform both of traveling by the operation of the user on board the driver's seat 42 (FIG. 1) and traveling by autonomously driving unmanned. In this example, other configurations and actions are the same as those in FIGS. 8 and 9.

In each of the above examples, a colorimeter that measures the chromaticity of a lawn may be used as the lawn detection device that detects the condition of a portion of lawn on the front side in the traveling direction, as an alternative to or together with the camera 54. In addition, the first controller and the second controller, or a single controller may control the traveling driver 21 in such a manner that the lawn mower preferentially travels on a portion of lawn that needs to be mowed, on the basis of the detection information acquired from the lawn detection device and the self-position information.

The lawn mower with an autonomous traveling function of each of the above-described embodiments includes the lawn mower with an autonomous traveling function according to the configuration of the present disclosure. Therefore, it is possible to achieve a lawn mower that can improve work efficiency without excessively enhancing the detection accuracy of a self-position, and that can perform both of traveling by the operation of a user on board and traveling by autonomously driving unmanned.

The invention claimed is:

1. An autonomously-driven lawn mower comprising:
a traveling driver including a traveling motor configured to drive at least one wheel;
a mower motor configured to drive at least one cutting blade;
at least one controller configured to:
control the traveling driver to cause the autonomously-driven lawn mower to travel autonomously, on a basis of information detected on the autonomously-driven lawn mower; and
control the mower motor;
a lawn detection device configured to detect a condition of a portion of lawn on a front side in a traveling direction; and
a position acquisition device configured to acquire self-position information,
wherein when a portion of lawn that needs to be mowed and a portion of lawn that has already been mowed are detected on the front side in the traveling direction, the at least one controller controls the traveling driver to cause the autonomously-driven lawn mower to travel on the portion of lawn that needs to be mowed while changing the traveling direction towards the portion of lawn that needs to be mowed, on the basis of detection information acquired from the lawn detection device and the self-position,
wherein the at least one controller includes a first controller, and a second controller capable of communicating with the first controller,
wherein the autonomously-driven lawn mower further comprises a traveling inverter configured to drive the traveling driver,
wherein the first controller is communicably connected to the traveling inverter, and controls the traveling driver,
wherein the second controller is communicably connected to the lawn detection device and the position acquisition device, and transmits a traveling instruction to the first controller on the basis of the detection information acquired from the lawn detection device and the self-position information, the traveling instruction including an instruction to cause the autonomously-driven lawn mower to travel on the portion of the lawn that needs to be mowed while changing the traveling direction towards the portion of lawn that needs to be mowed when the portion of lawn that needs to be mowed and the portion of lawn that has already been mowed are detected on the front side in the traveling direction, and
wherein the first controller controls the traveling driver in accordance with the traveling instruction.

2. The autonomously-driven lawn mower according to claim 1, comprising:
a battery configured to supply electric power to the traveling driver and the mower motor;
a battery monitoring device configured to monitor a status of the battery; and
a mower inverter configured to drive the mower motor,
wherein the first controller is communicably connected to the battery monitoring device and the mower inverter.

3. The autonomously-driven lawn mower according to claim 1, wherein the at least one controller is connected to a map outputter including a displayer capable of displaying a self-position and a planned traveling range on a map.

4. An autonomously-driven lawn mower comprising:
a traveling driver including a traveling motor configured to drive at least one wheel;
a mower motor configured to drive at least one cutting blade;
at least one controller configured to:
control the traveling driver to cause the autonomously-driven lawn mower to travel autonomously, on a basis of information detected on the autonomously-driven lawn mower; and control the mower motor;
a lawn detection device configured to detect a condition of a portion of lawn on a front side in a traveling direction;
a position acquisition device configured to acquire self-position information; and
an activity measuring instrument configured to measure activity of a portion of lawn from a reflectance of light in a visible red region and an infrared region,
wherein when a portion of lawn that needs to be mowed and a portion of lawn that has already been mowed are detected on the front side in the traveling direction, the at least one controller controls the traveling driver to cause the autonomously-driven lawn mower to travel on the portion of lawn that needs to be mowed while changing the traveling direction towards the portion of lawn that needs to be mowed, on the basis of detection information acquired from the lawn detection device and the self-position information, and
wherein the at least one controller associates measurement information of the activity measuring instrument with the self-position information to generate lawn condition information.

\* \* \* \* \*